(No Model.)
5 Sheets—Sheet 1.

A. MARTY.
BOAT AND MEANS FOR PROPELLING SAME.

No. 515,548. Patented Feb. 27, 1894.

WITNESSES:
R. B. Shepherd.
Chas. E. Smith

INVENTOR
Augustin Marty,
BY Briesen & Knauth
ATTORNEYS.

(No Model.) 5 Sheets—Sheet 2.
A. MARTY.
BOAT AND MEANS FOR PROPELLING SAME.
No. 515,548. Patented Feb. 27, 1894.
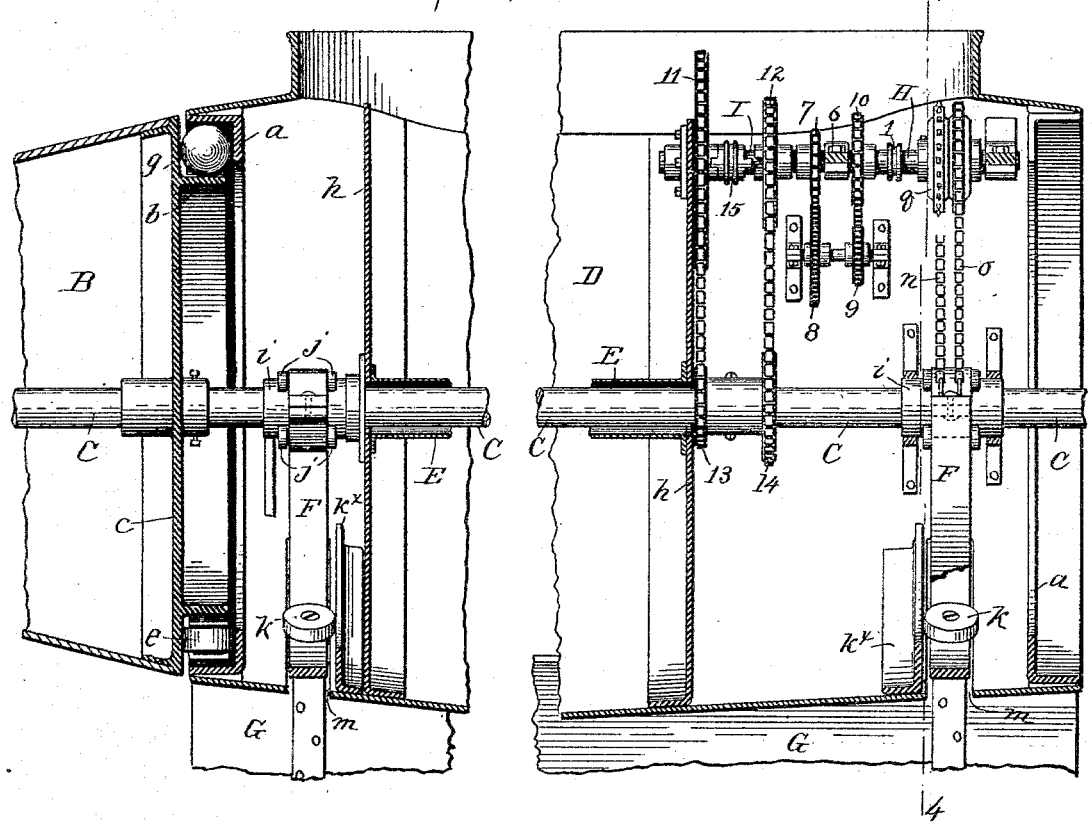
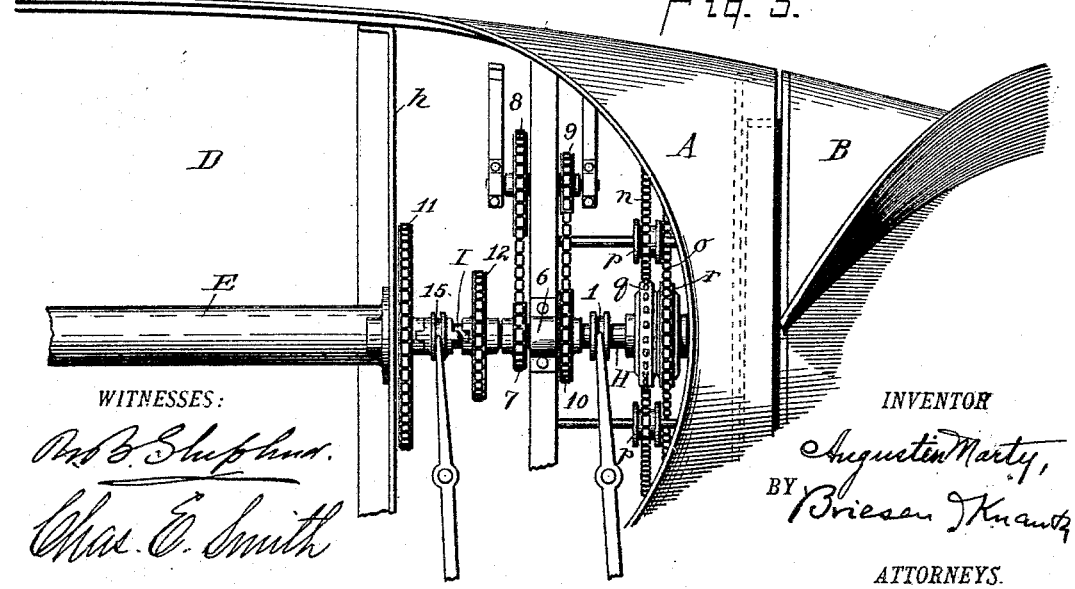
WITNESSES:
INVENTOR
Augustin Marty,
BY Briesen & Knauth
ATTORNEYS.

(No Model.) 5 Sheets—Sheet 3.

A. MARTY.
BOAT AND MEANS FOR PROPELLING SAME.

No. 515,548. Patented Feb. 27, 1894.

WITNESSES:
Ro. B. Shepherd.
Chas. E. Smith

INVENTOR
Augustin Marty,
BY Briesen & Knauth
ATTORNEYS.

(No Model.) 5 Sheets—Sheet 4.
A. MARTY.
BOAT AND MEANS FOR PROPELLING SAME.
No. 515,548. Patented Feb. 27, 1894.
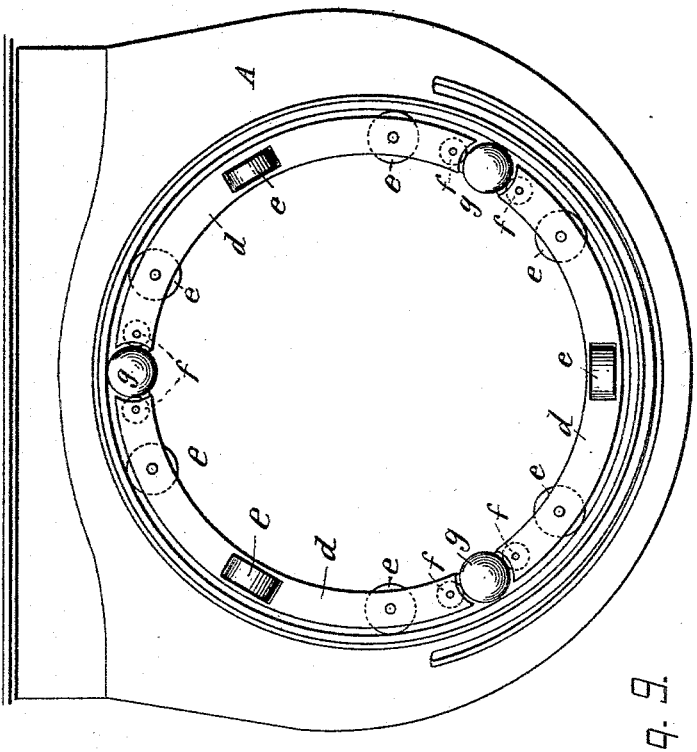
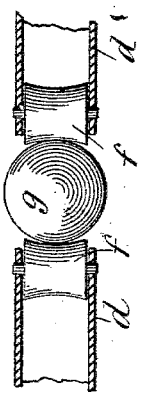
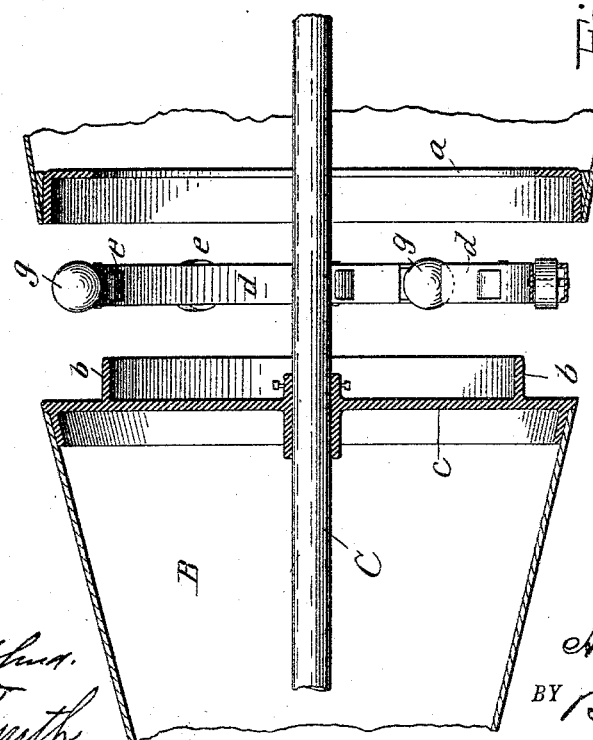
WITNESSES:
INVENTOR
ATTORNEYS (No Model.) 5 Sheets—Sheet 5.
A. MARTY.
BOAT AND MEANS FOR PROPELLING SAME.
No. 515,548. Patented Feb. 27, 1894.
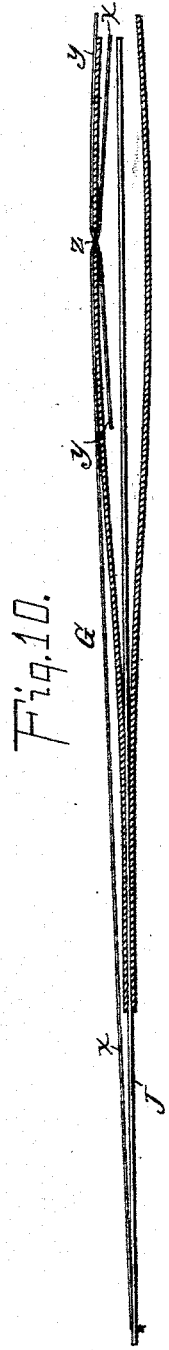
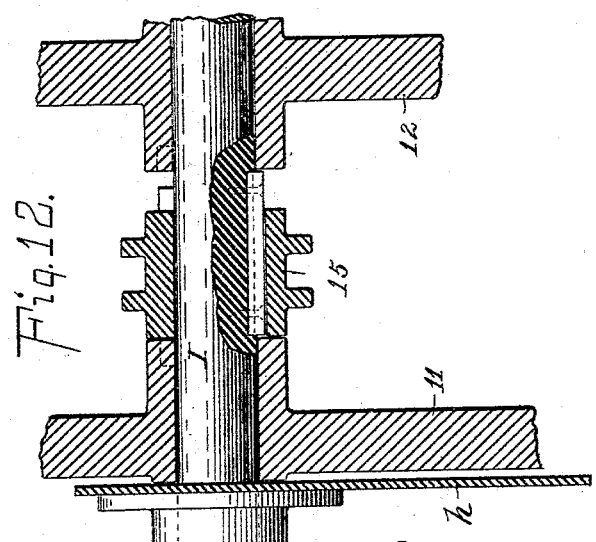
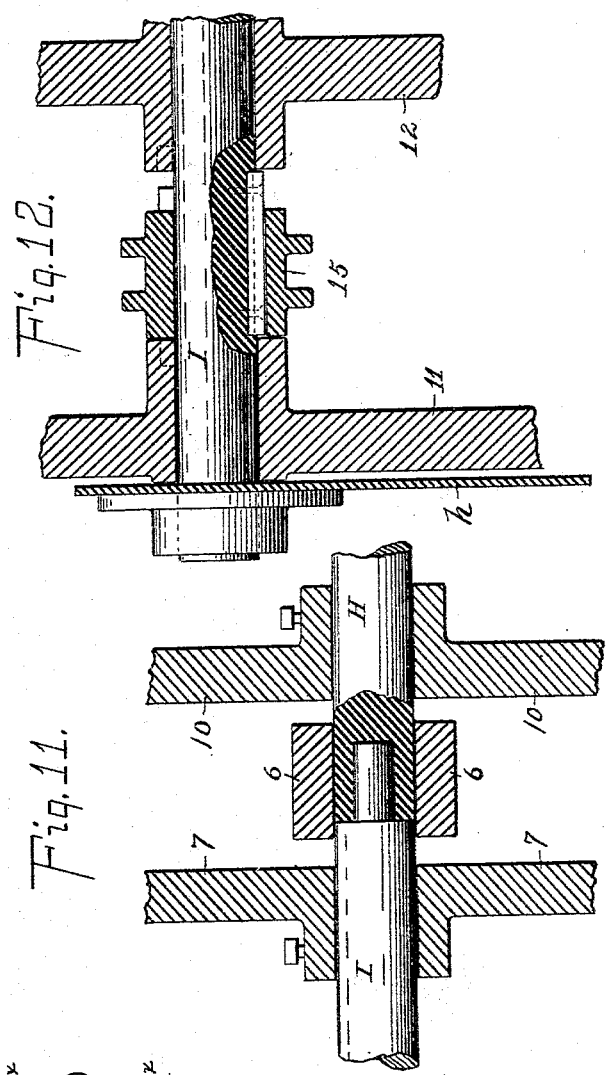
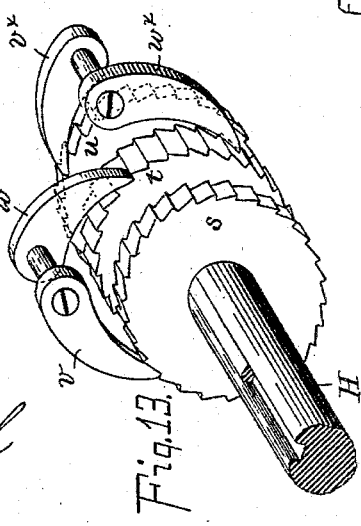
WITNESSES:
INVENTOR
Augustin Marty,
BY Briesen & Knauth
ATTORNEYS.

UNITED STATES PATENT OFFICE.

AGUSTIN MARTY, OF SAN FRANCISCO, CALIFORNIA, ASSIGNOR OF ONE-HALF TO RENÉ JANNIN LECOMTE, OF NEW YORK, N. Y.

BOAT AND MEANS FOR PROPELLING SAME.

SPECIFICATION forming part of Letters Patent No. 515,548, dated February 27, 1894.

Application filed August 3, 1891. Serial No. 401,616. (No model.)

*To all whom it may concern:*

Be it known that I, AGUSTIN MARTY, residing in the city and county of San Francisco, State of California, have invented an Improvement in Boats and Means for Propelling the Same, of which the following is a full, clear, and exact description, reference being had to the accompanying drawings, in which—

Figure 1:
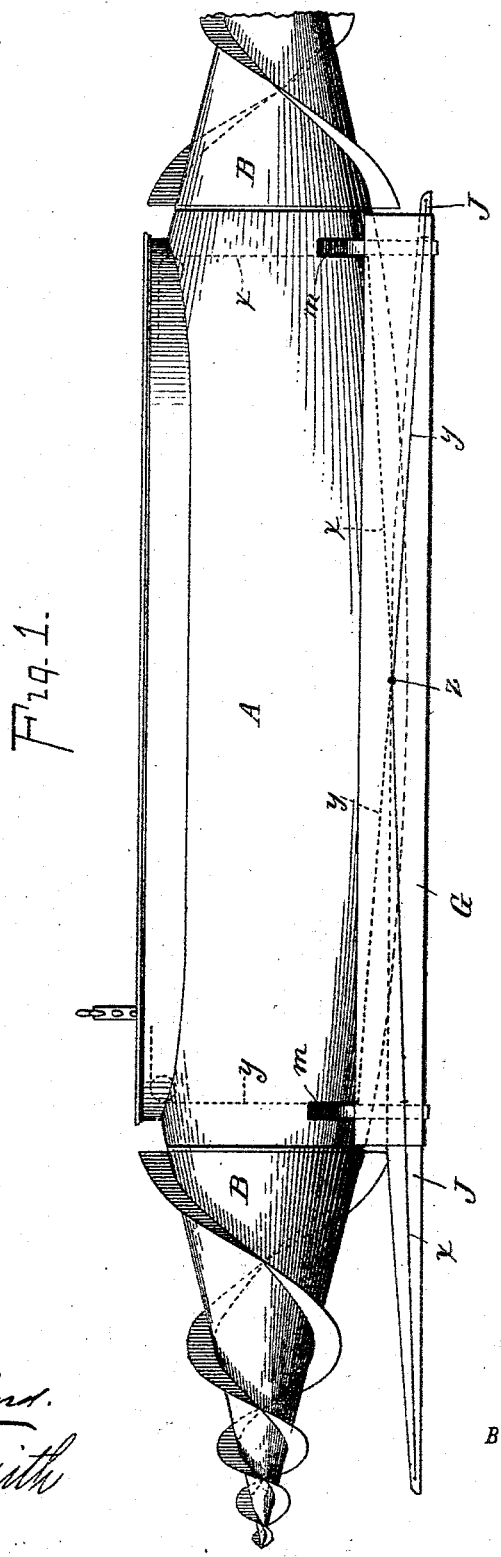
Figure 4:
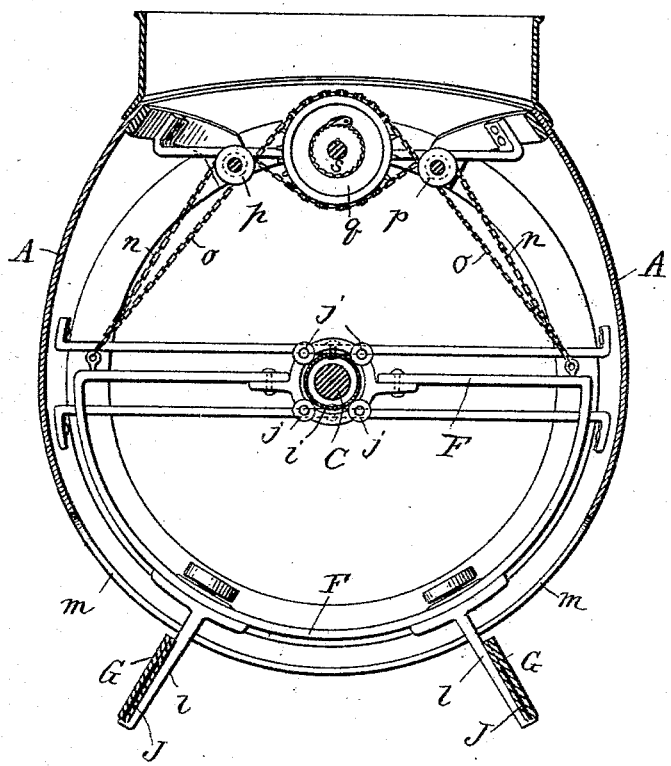
Figure 5:
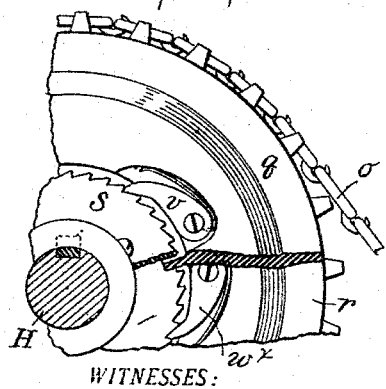
Figure 6:
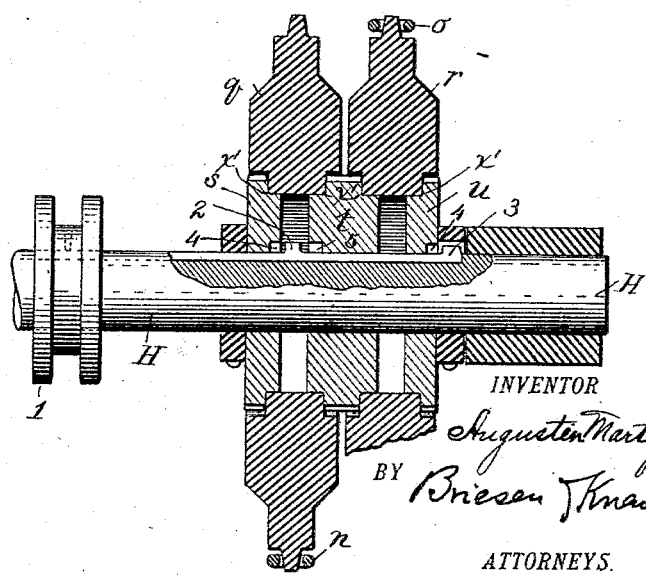

Figure 1 is a side view of my improved boat. Fig. 2 is an enlarged vertical section of the same, with parts broken away. Fig. 3 is a top view showing the propelling mechanism. Fig. 4 is a transverse section on the line 4—4 of Fig. 2. Figs. 5 and 6 are enlarged details of portions of my device. Figs. 7, 8 and 9 are details of the anti-friction connection between the boat body and propellers. Figs. 10, 11 and 12 are enlarged details, partly in section, of various parts of my improved boat; and Fig. 13 is a diagrammatic view of the pawls and ratchets for operating the shaft H.

The main object of my invention is to construct a boat which can be propelled wholly by the action of the waves, and said invention consists in the arrangement, combination of parts and to details hereinafter described and claimed.

In the drawings, where similar letters and figures designate like parts in the various views, A represents the body portion of my improved boat, which is preferably of practically cylindrical form, slightly converging at the ends, as shown in Fig. 1. To these converging ends of the boat-body are loosely connected propellers B, preferably of conical form. These propellers are or may be buoyant so as to help sustain the weight of the boat, and in the illustration are shown connected to a single main driving shaft C that extends the entire length of the boat.

In order to lessen the friction between the body of the boat and a propeller where the two meet, I construct an anti-friction bearing for the propeller by securing an L-shaped annular ring $a$ (see Fig. 7) to the end of the body of the boat and form a flange $b$ on the plate $c$ or head of the propeller, so that when the parts are in place as shown in Fig. 2 an annular recess is formed near the outer edges and between head $c$ of the propeller and the annular ring $a$. In this annular recess is adapted to fit a ring preferably of a shape corresponding to the shape of the recess and composed of a number of sections $d$ (see Fig. 8) which are designed to carry anti-friction rollers $e$ placed at right angles to each other. At the ends of each section $d$ are pivoted rollers $f$ (see Fig. 9) against which anti-friction balls $g$ are adapted to bear and separate the sections. It will be seen that by this construction a perfect anti-friction connection is had between the propellers and the body of the boat, but probably not such a connection which will prevent a certain amount of water from passing into the boat; and I therefore construct a bulk-head $h$ at each end of the boat body (Figs. 2 and 3) to prevent the said water from entering that portion of the boat D which is intended for occupancy and for other purposes which will be hereinafter described. The water line of the boat shown is about on a line with the main driving shaft C, so that most of the mechanism which may be contained in the water-chambers back of the bulk-heads and above the main driving shaft C, will be out of contact with the water.

Having described the construction of the hull of my improved boat and the manner in which the propellers are connected, I will now proceed to describe the means for and method of operating the same. As before stated, the main driving shaft C is attached to both propellers and preferably is a single shaft extending from end to end of the boat and is surrounded by an outer sleeve or tube E which extends through that portion (D) of the boat intended for occupancy, and has open communication with the water-chambers outside of the bulk-heads $h$, at each end of the boat hull, so that a free circulation of water can be had from one chamber to the other. Disconnected from and surrounding the driving shaft C, in each of the water-compartments is a properly supported short sleeve $i$, the purpose of which is to form a bearing for the anti-friction rollers $j$ of two loosely swung frames F. These loosely swung frames F have anti-friction rollers $k$ which bear against suitable tracks $k^\times$ (Fig. 2) and prevent the endwise movement of the frames and the parts attached thereto. To each of the frames F are attached two arms $l$ which protrude through slots $m$ in the body of the boat on each side of the lower portion thereof. To the protruding ends of the arms $l$ on each side is secured a metallic wing or keel G which is about the length of the hull of the boat and preferably formed by uniting two sheets of metal at the ends and slightly diverging them from each other at the center so as to form a small space between them. The object of these wings or keels is to form anchors or resistance pieces to prevent lateral movement of the frames F and at the same time not to impede the advance movement of the boat, as will be hereinafter explained. To opposite sides of preferably one of the frames F are secured the ends of two sprocket chains $n$, $o$, the former of which passes around suitably supported pulleys $p$ and engages the under side of a sprocket-gear $q$, the latter passing over and engaging the upper side of a similar sprocket-gear $r$, so it will be seen that every movement of the frames F and the hull of the boat with relation to each other will cause the sprocket-gears $q$ and $r$ to be moved an equal distance in opposite directions.

The detail construction of the sprocket-gears $q$ and $r$ is best shown in Figs. 5 and 6, from which it will be seen that the gears have open centers and are supported and adapted to rotate in grooves $x'$ formed in three ratchet wheels $s$, $t$, $u$ supported upon a shaft H. The ratchet wheels $s$, $u$ have teeth extending in the same direction and in an opposite direction from the teeth on the central ratchet wheel $t$, and are adapted to be engaged by pawls $v$, $v^x$ carried on the outer sides of the sprocket wheels $q$. T. respectively. The central ratchet $t$, as before stated, has teeth extending in an opposite direction from the teeth on the other two ratchet wheels, and is adapted to be engaged by pawls $w$, $w^x$ carried on the inner sides of the sprocket-gears $q$ and $r$ respectively. In order to connect either the outside ratchet wheels $s$, $u$ or the central wheel $t$ to the shaft H, I have provided a splined clutch 1 (Fig. 6) which may be shifted by any suitable means, and is provided with lugs 2, 3, adapted to be engaged in the notches 4 in the ratchet wheels $s$, $u$, or in the notch 5 in the central ratchet wheel $t$, or when it is desired to allow the sprocket wheels $q$, $r$, and the ratchet wheels $s$, $t$, $u$, (operated thereby) to rotate without moving the shaft H, it is merely necessary to move the clutch 1 a sufficient distance, so that the lugs 2, 3, thereon will be out of contact with all three of the ratchet wheels as shown in Fig. 6 for purposes which will be hereinafter more fully described.

Upon reference to Figs. 2 and 11 it will be seen that the shaft H ends at the bearing 6 and is loosely connected with and forms a bearing for a free end of a second shaft I, upon which is mounted a sprocket gear 7 that connects with a larger gear 8 driven from the shaft H through the sprocket gears 9 and 10 and their chain connection. These gears 7, 8, 9 and 10 are multiple gears, their object being to cause the shaft I to make several revolutions to every revolution of the shaft H. Sprocket gears 11 and 12 on the shaft I are of different size and connected by suitable sprocket chains to the gears 13 and 14 on the main driving shaft C. A splined clutch 15 is interposed (shown in detail in Fig. 12) between the gears 11 and 12, so that either of them can be operatively connected with the shaft I, whereby the main driving shaft and consequently the boat can be driven at different rates of speed. Any suitable number of the frames F with propelling mechanism attached may be used, but for smaller boats I prefer to use but one as shown.

It is evident that I may use any suitable means for supporting the ends of the wings or keels G at that end of the boat where there is no propelling mechanism; but I have found that a frame F similar to that to which the propelling mechanism is connected, is simple and can be used with good effect, and therefore prefer to use it.

The steering mechanism which I preferably use in my improved boat is best shown in Figs. 1, 4 and 10, and which I will now proceed to describe. As before stated, the wings G preferably consist of two metallic strips joined at the edges and converging from each other at the center as shown in Fig. 10. Extending entirely through each of the wings G and adapted to protrude a considerable distance from them at either end are flexible rudders J, one for each wing or keel. The flexible rudders J are loosely carried in the wings G and adapted to slide from end to end therein, so that they can be shifted from end to end of the boat, thereby avoiding turning the entire boat when it is desired to go in an opposite direction. The means for accomplishing this consists of two rope or chain connections $x$ $y$ attached to opposite ends on the outside of each of the rudders J and carried through an aperture $z$ in the center of the wings G to the interior thereof and from there through the apertures $m$ in the boat body to a suitable wheel where they can be operated. It will be seen that by securing, say, the ropes $y$ the ends of the rudders to which said ropes are attached will be secured from further movement in an outward direction, while a strain on the ropes $x$ (the ropes $y$ having first been fastened) will bend the rudder-blades J from each other in opposite directions; the difference of the planes of the aperture $z$ and the rudder-blade affording sufficient leverage for the ropes to bend the rudder-blade. So that when it is desired to steer to the right, the right rudder-blade should be bent, allowing the rudder of the left wing to remain at rest; when it is desired to steer to the left, the left rudder-blade is bent, the rudder-blade in the right wing being allowed to remain at rest; and when it is desired to retard the head movement, both blades can be bent in opposite directions.

Having described the various parts of my boat, I will now proceed to describe the operation thereof.

It will be seen by the shape of my boat that it requires very little action of the waves to oscillate the body or hull around the main driving shaft C as a center. When the boat is oscillated from one side to the other, the wings or keels G will hold the frames F comparatively stationary, so that when the boat is oscillated first to one side, one of the sprocket-gears (say $q$ supposing the clutch 1 to engage the ratchet wheels $s, u$), is caused to roll on the sprocket chain $n$ (which is held comparatively stationary by the frames F) turning said gear, the pawl $v$ thereon engaging and turning the ratchet wheel $s$, which turns the shaft H, multiple train of gear, and the shaft I, while pawl $w$ rides over the teeth on the ratchet wheel $t$ (see Fig. 13). The shaft I thus operated communicates motion to main driving shaft C through the sprocket gears 11 and 13 or 12 and 14 with their chain connections, thereby rotating the propellers and advancing the boat. During this movement of the sprocket-gear $q$, sprocket-gear $r$, which is similar to the gear $q$, revolves in an opposite direction, allowing the pawl $v^x$ thereon to ride over the ratchet teeth on the wheel $u$, while the pawl $w^x$ engages and turns the wheel $t$, having no effect, however, on the operation of the shaft, since it is disconnected therefrom. When the boat is oscillated in an opposite direction the pawl $v$ on the gear $q$ rides over the teeth of the ratchet wheel $s$, while the pawl $w$ on said gear engages and turns the wheel $t$ without effect on the shaft H. During this backward movement of the sprocket-gear $q$, the gear $r$ moves in an opposite direction, and the pawl $v^x$ thereon engages and turns the ratchet wheel $u$, and all of the mechanism to the propellers, as above described; while the pawl $w^x$ rides over the teeth of the wheel $t$ without affecting it. It will be observed that by this construction every oscillation of the hull of the boat with relation to the frames F, be it ever so small, causes the propellers B to be turned and the boat to be advanced. In order to make the boat run in an opposite direction, it is merely necessary to shift the rudders J as above described and to shift the clutch 1 so as to engage the central ratchet wheel $t$, when practically the same operation follows, except that the shaft H, gearing connected therewith and the propellers, are turned in an opposite direction.

It is obvious that there are many changes in details I might make without departing from the spirit of my invention, such as changing the form of multiple gear or dispensing with it entirely; changing the form of the boat, the steering mechanism, and the boat might be used in connection with any ordinary form of propeller instead of those shown by me. I do not limit myself to the details shown and described, they being merely for the purpose of illustration.

Having described my invention, what I claim, and desire to secure by Letters Patent, is—

1. The combination of a boat hull, propellers carried thereby, and means substantially as described for converting the oscillation of the boat around its longitudinal axis into power for moving the propellers, substantially as specified.

2. The combination of a boat hull, propellers carried thereby, mechanism adapted to be held comparatively stationary with relation to the hull of the boat, whereby the oscillation of the boat hull around its longitudinal axis can be converted into power for operating the propellers, substantially as specified.

3. The combination of a boat hull, propellers carried thereby, mechanism adapted to be held by the water in a comparatively stationary manner with relation to the oscillation of the hull of the boat whereby a movement of the hull of the boat around its longitudinal axis with relation to the said comparatively stationary mechanism, will cause the propellers to be operated, substantially as specified.

4. The combination of a boat hull A, propellers B carried thereby, main driving shaft C, frame F held comparatively stationary with relation to said boat hull, and means substantially as described connected to said frame F for utilizing the oscillation of the hull around its longitudinal axis with relation to the frames F, for operating the propellers B, substantially as specified.

5. The combination of a boat hull A, propellers B carried thereby, main driving shaft C, frame F, wings G and sprocket-chains $n, o$, connected to said frame, sprocket-gears $q, r$, connected with said chains, ratchet-wheels $s, t, u$, adapted to be operated by said sprocket-gears and means substantially as described for operating the propellers B from said ratchet-wheels, substantially as and for the purpose specified.

6. The combination of boat-hull A, propellers B, carried thereby, main driving shaft C, frame F, wings G, connected therewith, and adapted to hold said frame comparatively stationary with relation to the oscillations of said hull A, means substantially as described for propelling the main driving shaft by the movement of the hull with relation to said frame and multiple gear interposed between said propelling mechanism and the main driving shaft, substantially as and for the purposes specified.

7. The combination of a boat hull A., wings G, carried thereby, flexible steering blades J J carried by said wings G, and adapted to slide from end to end, and ropes $x\ y$ attached to the ends of said blades, substantially as described and for the purposes specified.

AGUSTIN MARTY.

Witnesses:
EMIGDIA MEDINA,
PABLO NOTIME.